United States Patent [19]

Van den Broek et al.

[11] 4,328,479
[45] May 4, 1982

[54] INSTALLATION FOR DETECTING ANOMALIES IN INFLATING OF THE TIRES OF A GUIDED VEHICLE

[75] Inventors: Philippe Van den Broek, Versailles; René Gaudu, Bois D'Arcy; Paul Carrier, Velizy, all of France

[73] Assignee: MATRA, A French Society, Paris, France

[21] Appl. No.: 51,899

[22] Filed: Jun. 25, 1979

[30] Foreign Application Priority Data

Jun. 26, 1978 [FR] France ............... 78 19057

[51] Int. Cl.³ .................. B60C 23/02; G08B 19/00
[52] U.S. Cl. ..................... 340/58; 73/146.5; 340/38 L
[58] Field of Search ............. 340/58, 32, 38 L, 676; 73/146.5

[56] References Cited

U.S. PATENT DOCUMENTS

| | | | |
|---|---|---|---|
| 3,602,884 | 8/1971 | Brumbelow | 340/58 |
| 3,656,137 | 4/1972 | Ratz | 340/676 |
| 3,831,161 | 8/1974 | Enabnit | 340/58 X |
| 3,895,347 | 7/1975 | Tahusagawa et al. | 340/58 |
| 4,067,235 | 1/1978 | Markland et al. | 73/146.5 |
| 4,074,227 | 2/1978 | Kalmus | 340/58 |

Primary Examiner—John W. Caldwell, Sr.
Assistant Examiner—Joseph E. Nowicki
Attorney, Agent, or Firm—Wolf, Greenfield & Sacks

[57] ABSTRACT

The system for detecting abnormalities in the inflation level of a tire of a vehicle includes a coil of metallic wire supported by the wheel and contactor including a switch means responsive to tire pressure for coupling and uncoupling the coil of metallic wire in response to changes in tire pressure. A detector is provided for detecting metallic masses, and this detector is supported on the ground in a position to enable passage of the vehicle wheel closely adjacent thereto.

8 Claims, 5 Drawing Figures

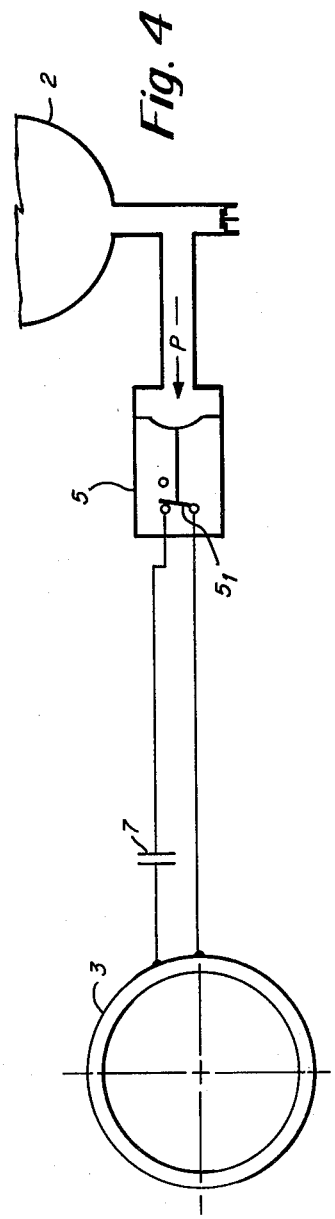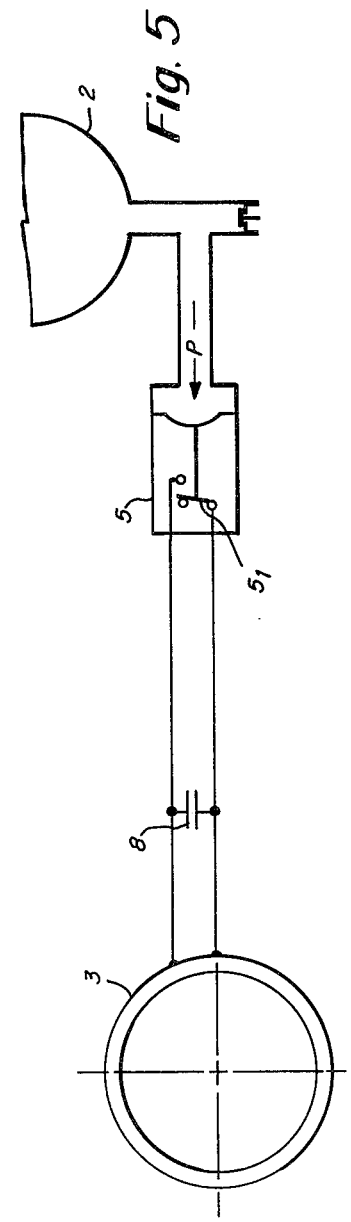

INSTALLATION FOR DETECTING ANOMALIES IN INFLATING OF THE TIRES OF A GUIDED VEHICLE

The invention concerns an installation for detecting abnormalities in the inflation of a vehicle tire.

The installation of the invention is characterized in that it consists of a coil of metallic wire fitted to the wheel supporting the tire to be controlled, a contactor sensitive to the pressure and connected, so as to be operated, to the tire to be controlled, said contactor being branched between the two ends of said coil, a detector of metallic mass connected to a signalling means, said detector being fitted into the ground in the vicinity of the passage of the wheel of the vehicle.

According to another characteristic of the invention, the detector of metallic mass consists of two coils and a device for detecting any modification in their mutual inductance.

According to another characteristic of the invention, the capacitor is connected to the coil so as to constitute a tuned circuit with the latter.

The invention is presented by way of non-limitative example in the attached drawings, wherein.

FIGS. 4 and 5 diagrammatically show two other modes of embodiment of the installation.

Consequently, the present invention is aimed at achieving an installation permitting the automatic detection of inflation pressure of the vehicle tires when the vehicle is running. The apparatus consisting of a part fitted to each wheel of the vehicle and of a part fitted into the ground in the vicinity of the passage of the wheel, said part fitted into the ground carrying an appropriate detecting means connected to a signalling means so as to immediately reveal any anomaly in inflating and generally a failure in the pressure of the tire involved.

According to the invention, on each wheel to be controlled, which consist of a rim 1 and a tire 2, a flat coil 3 consisting of turns of fine metallic wire is fitted, said coil 3 being arranged coaxially to the axis 4 of the wheel.

Figure 1:
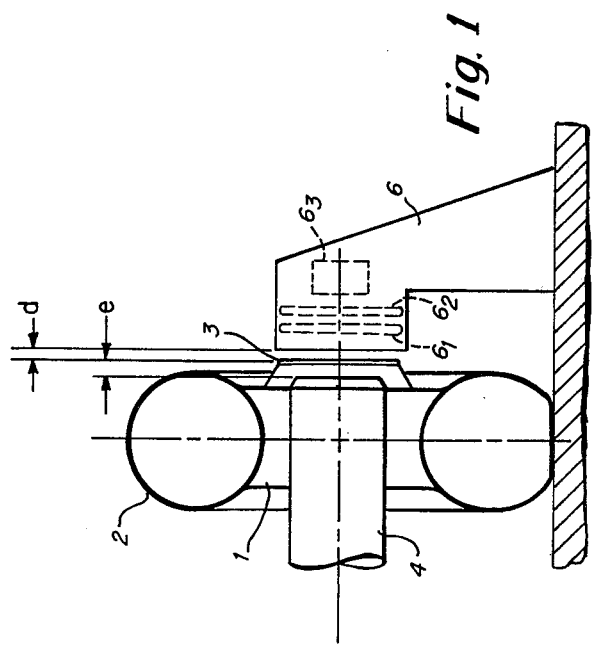
FIG. 1 is a side view of a wheel of a guided vehicle carrying an installation according to the invention.
Figure 2:
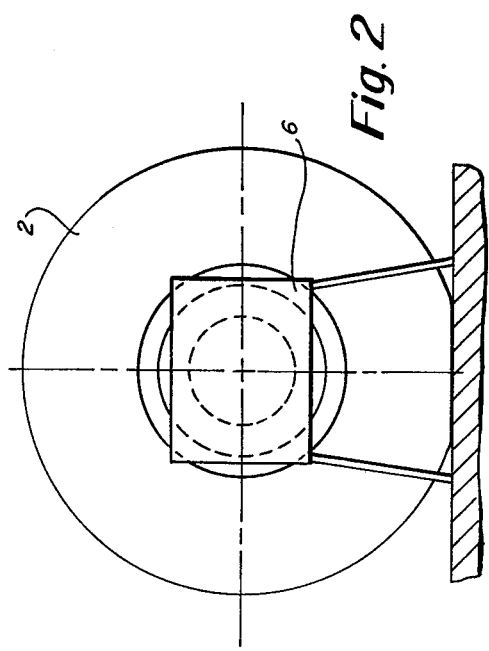
FIG. 2 is a view of the right hand portion of FIG. 1.
Figure 3:
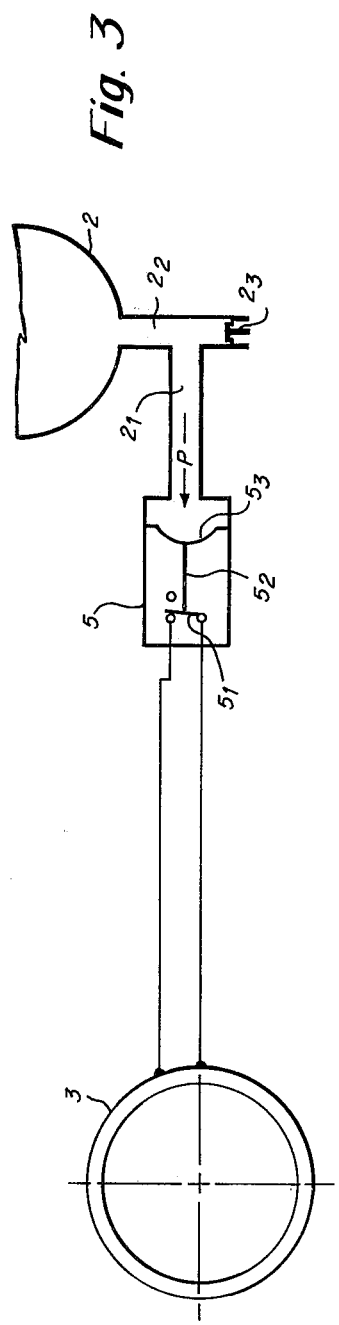
FIG. 3 is a diagram showing the working of the installation of the invention.

The ends of said coil are connected (see FIG. 2) to a contactor sensitive to the pressure, said contactor 5 itself being connected to the tire 2, that is to say to the tube of the tire or to the tire itself if the latter is tubeless.

The contactor sensitive to the pressure thus carries, in the example shown, a microcontact $5_1$ connected to a membrane $5_3$ by means of a system of rods $5_2$. Said membrane is subjected to the pressure P of the tire 2 and is connected to this end to said tire by a piping $2_1$ connected for example to the mouthpiece $2_2$ of said tire which receives the valve $2_3$.

The equipment on the ground, positioned in the vicinity of the passage of the wheel of the vehicle, consists of a detector of metallic mass positioned in such a way as, when the vehicle is passing along, it faces the center of the wheels at a distance d of said equipment fitted onto each said wheels.

Said equipment on the ground consists of two coils $6_1$, $6_2$, associated with a detecting device $6_3$ which detects any change in their mutual inductance, said device itself being connected to any signalling means whatever (not shown) of a controlling station for detecting any abnormalities in the inflation of the tire.

In said installation, the contactors 5 are adjusted so as to make the microcontacts $5_1$ rotate under a determined pressure so as to either connect or on the contrary part the two ends of the coil 3 from each other.

When the two ends of the coil 3 are electrically parted from each other (open), the equipment on the ground 6 does not emit any signal where the wheel is passing provided that the metallic masses of the rim 1 and of the hub, as well as all the metallic masses of the vehicle, are sufficiently distant from the coils $6_1$ and $6_2$.

On the other hand, when the microcontacts are switched off (closed), the coil 3 acts like a metallic plate whose passage before the equipment on the ground modifies the mutual inductance of the two coils $6_1$, $6_2$. Said change in the mutual inductance detected by the device $6_3$ results in the generation of an electric signal which then can be changed into a logical signal transmitted to a controlling station.

For the detection of a pressure inside a tire which would be inferior or superior to a normal value, the installation can work in two different ways.

If the microcontact $5_1$ of the contactor 5 is switched on when the pressure is normal and on the contrary switched off when it is too high, in such a case the equipment on the ground does not detect anything when normally working, but generates an alarm signal when detecting a metallic presence resulting from the connection of the ends of the coil 3 with the microcontact $5_1$.

On the other hand, if the microcontact $5_1$ of the contactor 5 is switched off when the pressure is normal and opens when said pressure falls down under the determined threshold or on the contrary overpasses it, in such a case the detector detects a metallic mass where the wheel normally inflated passes and the alarm signal is generated through an electronic counting which compares the number of detections with the number of wheels located at one side of the vehicle.

So as to permit to detect the anomalies in the inflating of tires at each side of the vehicle, obviously the installation will carry two equipments on the ground positioned at each side of the passage of said vehicle, in the vicinity of the wheels.

Also, said installation can be used for detecting at the same time the inflating pressures superior or inferior to a normal pressure. In such a case, the contactor 5 will carry microcontacts $5_1$, achieved as a reverser, and rotating between two positions, one of them corresponding to a superior pressure, the other to a pressure inferior to the normal one.

Also, the size of the coil 3 is determined so as to be in accordance with the distance d parting it from the coils $6_1$ and $6_2$ of the detector, the distance e parting the coil from the wheel and the hub thereof must be sufficient (several centimeters) so as to reduce the pertubation caused by the metallic masses of the hub and the rim 1.

The same applies to the other metallic masses of the vehicle which must not pass too close to the coils $6_1$ and $6_2$.

According to the invention, also it has been provided to improve the efficiency of the installation or to reduce the effect of the parasite metallic masses (notably when the distance d between the coil and the detector cannot be made sufficiently small) by performing the electric resonance of the coil 3.

In such a case, the coil 3 is tuned by means of an electric capacitance with an adequate value with the emitting frequency of the detector on the ground.

As shown in FIG. 4, the circuit consists of a coil 3 whose ends are connected to one another by a series circuit carrying a capacitor 7 and the microcontact $5_1$ of the contactor 5.

When the pressure of the tire 2 is normal, the microcontact $5_1$ is switched off and the circuit tuned with the frequency of the detector acts like a screen towards any metallic mass located behind it in relation to the detector (hub of wheel in particular). Then, there is no detection of metallic masses.

On the other hand, when the inflating pressure is lower than the determined threshold, the contactor 5 opens the circuit which thus become "transparent". The detector can then detect the metallic mass constituted by the hub of the wheel provided it is at a suitable distance therefrom.

According to the mode of embodiment shown in FIG. 5, the part of the installation fitted to the wheel of the vehicle consists of a coil 3, between the ends of which a parallel circuit is fitted which carries the capacitor 8 and the microcontact $5_1$ of the contactor 5.

In such a case, when the inflating pressure is normal, the microcontact $5_1$ is switched on and the tuned circuit acts like a screen.

On the other hand, when the pressure is lower than the determined threshold, the microcontact $5_1$ switches off, which puts the capacitor 8 in short-circuit. Then the circuit is no longer tuned and no longer acts as a screen but, on the contrary, acts like a metallic mass which is detected right away by the detector on the ground when the wheel of the vehicle passes before it.

Then, it can be seen that the installation according to the invention, which consists of two detectors fitted on the ground (one at the right hand, the other at the left hand), makes it possible to control any number of vehicles and for example those of a train of wagons when they pass along, the positioning of said detectors on the ground thus making much easy the transmission of the detection to a central controlling station.

In addition, the part fitted to the wheels of the vehicle is very simple and easy and can then be made very safe.

Also, the installation according to the invention will make it possible to detect any abnormal temperature of the tire by detecting an over pressure. In such a case too, the contactor sensitive to the pressure can consist of a specific means interpreting the value of the pressure from the measurement of the temperature.

Also, arrangements having an intrinsic safety can be provided depending on the actuating direction of the embarked contactor 5. For example, a deterioration of the embarked circuit will cause a detection of failure.

What we claim is:

1. A system for detecting abnormalities in the inflation level of the tire of a vehicle, comprising:
   a coil of metallic wire,
   means supporting the coil of metallic wire to the vehicle wheel which in turn supports the tire to be monitored,
   said means supporting the coil adapted to hold the coil in a substantially vertical plane spaced from the wheel and the hub thereof a distance on the order of several centimeters so as to reduce the pertubation caused by the metallic masses of the hub and the rim,
   a contactor associated with the tire and wheel including means for monitoring tire pressure and switch means responsive to said means for monitoring tire pressure for coupling and uncoupling the ends of the coil of metallic wire in response to changes in tire pressure,
   said switch means having an open position in which the coil ends are open-circuited and a closed position in which the coil ends are short-circuited,
   said coil functioning as a metallic object when the coil ends are short-circuited,
   a detector of metallic masses including signal fault generating means,
   said detector comprising at least one detector coil and the signal fault generating means responsive to modification of the mutual inductance of the detector coil,
   and means supporting said detector to the ground in a stationary position to enable passage of the vehicle wheel closely adjacent thereto,
   said means supporting said detector adapted to hold the detector coil in a substantially vertical plane spaced from the wheel coil by a distance determined by the wheel coil size and with the axis of the wheel coil and detector coil being substantially in line.

2. A system as set forth in claim 1 wherein the detector includes two coils.

3. A system as set forth in claim 1 in combination with a capacitance connected to the coil so as to comprise a tuned circuit.

4. A system as set forth in claim 3 wherein the capacitance is arranged in series with the contactor between the ends of the coil.

5. A system as set forth in claim 3 wherein the capacitance is arranged in parallel with the contactor between the two ends of the coil.

6. A system as set forth in claim 1 wherein the detector includes at least one detector coil whereby the mutual inductance of the detector coil is modified in the closed position of the switch means.

7. A system as set forth in claim 1 wherein the wheel coil and detector coils are disposed substantially in parallel planes.

8. A system as set forth in claim 7 wherein the detector comprises a pair of parallel disposed detector coils with the detector coils being substantially parallel with the wheel coil.

* * * * *